(No Model.)
A. GLISSON.
CORN PLANTER.
No. 332,602. Patented Dec. 15, 1885.
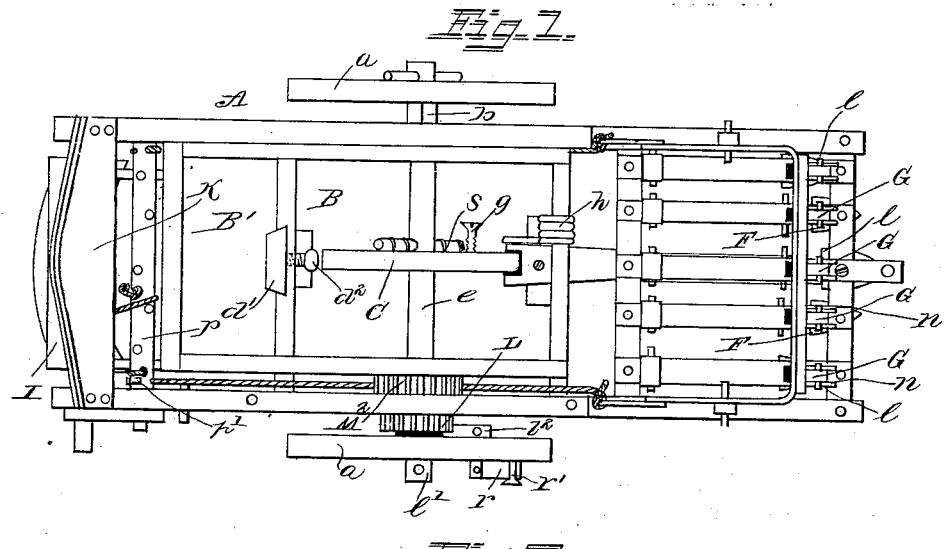
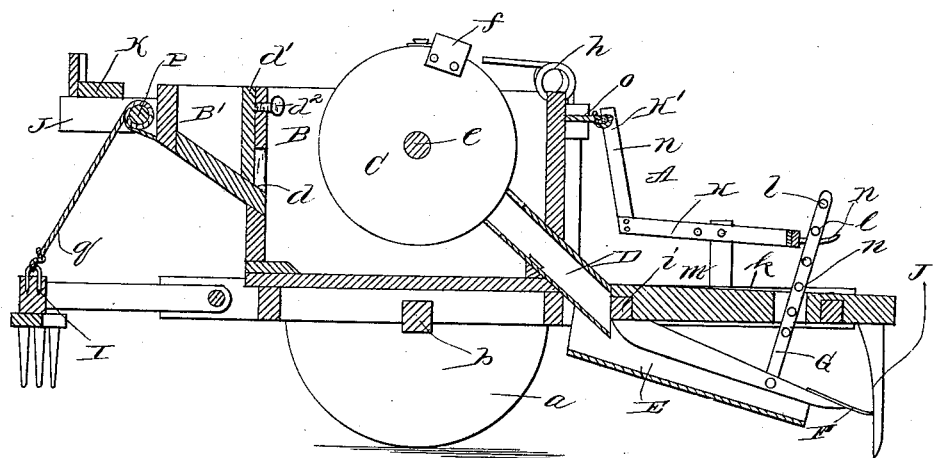
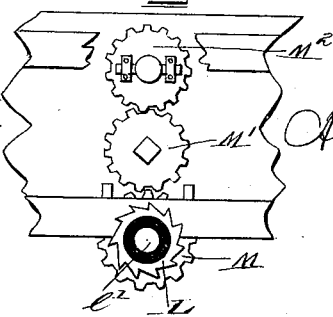
WITNESSES.
INVENTOR.
Abram Glisson
By Myers & Co
ATTORNEYS.

UNITED STATES PATENT OFFICE.

UNITED STATES PATENT OFFICE.

ABRAM GLISSON, OF RUTHERFORD, TENNESSEE.

CORN-PLANTER.

SPECIFICATION forming part of Letters Patent No. 332,602, dated December 15, 1885.

Application filed August 27, 1885. Serial No. 175,483. (No model.)

*To all whom it may concern:*

Be it known that I, ABRAM GLISSON, a citizen of the United States of America, residing at Rutherford, in the county of Gibson and State of Tennessee, have invented certain new and useful Improvements in Corn-Planters, of which the following is a specification, reference being had therein to the accompanying drawings.

This invention pertains to improvements in planters and fertilizer-distributers combined, the former being designed particularly to plant corn and peas, while the latter, as indicated, is to distribute fertilizers; and the invention consists of the combinations of parts, including their construction, substantially as hereinafter fully set forth, and pointed out in the claims.

In the accompanying drawings, Figure 1 is a plan view of my improved corn-planter and fertilizer-distributer combined. Fig. 2 is a longitudinal section thereof, and Fig. 3 is a detailed side view with parts broken away.

In the organization of my invention I employ a frame, A, which is borne by suitable transporting and driving wheels, *a a*, whose axle *b* is secured to said frame.

Upon the frame A is mounted and secured a seed or grain receptacle or box, B, of any suitable construction, forward of which latter the said frame extends some distance, as shown, the purpose of which will appear hereinafter.

Upon the rear of the receptacle or box B is a supplementary box or chamber, B', to contain fertilizers, the same having an inclined bottom sloping toward the receptacle B, the lower edge of which bottom is arranged about midway the height of the box B, at which point the latter is provided with an opening, *d*, for the passage from the chamber B' into the box or receptacle B of the contents of the former. The opening *d* is covered by a slide, *d'*, to cut off the flow or passage of the said contents of chamber B', the slide being beveled or dovetailed and fitting in a correspondingly beveled or dovetailed recess in the rear side of the receptacle B, and said slide is held in the desired position with relation to the opening *d*, so as to regulate the passage of the contents of the chamber B' by a suitable set-screw secured in an aperture or slot in the partition or wall between the receptacle B and said chamber B'.

Within the receptacle or box B is hung upon an axis or shaft, *e*, bearing in the sides of said box or receptacle, a seed or fertilizer dropping wheel or disk, C, which carries upon its periphery a seed or fertilizer cell or cup, *f*.

D is a spout or chute fixed in the lower front edge of the receptacle B in an oblique position, with its inner end slotted to receive the periphery of the wheel or disk C, and to permit the seed or fertilizer to drop thereinto from the latter, the lower projecting end of said chute or spout discharging into a boot, E, which will be referred to further presently. Upon one side of the wheel or disk C are secured screws or projections *g*, which may be screwed into and projecting from the said disk or wheel, and are adapted to be struck by a spring-arm, *h*, secured to the front upper edge of the receptacle or box B, and projecting therefrom, so as to stand in the plane or path of the movement of said projections *g*. By means of this disposition of parts the seed or fertilizer cell or cup *f* of the wheel, as the concussion produced by the contact of the said projections and spring-arm takes place, will be jarred or vibrated, so as to prevent the wedging or remaining of the seed in said cell or cup, and thus insure the dropping of the seed into the spout D.

F is a series of plow-shovels and their standards, the inner ends of the latter being fastened to a cross-bar, *i*, pivoted at its ends in the inner sides of the frame A, in front of the receptacle B, and to the under side of the middle one of said standards is secured the boot E, to conduct the seed or fertilizer to the ground.

G are arms pivotally connected at their lower ends to the plow-shovel standards F, near the shovels of the latter, and extending upward through guide-slots *j* in longitudinal bars or beams *k*, fastened at their ends to the forward cross-bar and a second cross-bar of the frame A. From the sides of the arms G project at short intervals apart studs or pins *l*, the functions of which will appear further on.

H is a bail-shaped lever pivoted about centrally upon short uprights or posts *m*, fastened to the beams or bars *k*. The outer end or cross-bar of said lever is provided with slightly upward curved fingers *n*, which catch under each of two projections or pins, *l*, of the shovel or plow standard arms G, to permit of the raising and lowering of the standards and their shovels or plows through contrivances hereinafter specified. The series of lateral pins or projections $l$ of the arms G permit of the gaging of the depth of penetration of the soil by the shovels or plows, according as it may be desired to plow or open the furrow to a greater or less depth for reception of the seed or fertilizer. The inner ends of the lever H are provided with upwardly-projecting fixed portions H', which are connected by cords or straps $o$ to a roller or shaft, $p$, hung in projections of the sides of the receptacle B in rear of the said latter receptacle, which roller or shaft is provided with a crank or handle to permit the turning of the same and the winding thereon when it is desired to raise or elevate the plows or shovels, and said roller or shaft is held in the desired position by a loosely-secured pawl, $p'$, engaging with suitable projections at one end of said roller or shaft. From the same shaft or roller $p$ is suspended by a cord, $q$, a harrow, I, having a gently-curved row of teeth, and its arms or side pieces pivoted to the rear ends of the frame A, whereby simultaneously with the adjustment of the shovel or plow standards the harrow may also be adjusted as may be desired. To the extreme forward end of the frame A, or rather to a central projecting bar thereof, is secured a pendent colter, J.

K is the driver's seat, mounted in position at the rear of the supplementary chamber or receptacle B', as shown, or otherwise.

L is a ratchet mounted loosely by a tubular shaft, $l'$, upon the axle or shaft of the driving or transporting wheels $a$, and engaged by a spring pawl, $l^2$, secured to one of the said wheels, to transmit motion from the latter to said ratchet. Upon the same tubular shaft with the ratchet L is secured a pinion, M, which intergears with a second pinion, M', which in turn gears with a third pinion, M², fast upon the shaft of the fertilizer or seed dropping wheel axle to transmit motion to said wheel.

It will be seen that the fingers which project forwardly from the cross-bar of the bail-shaped lever and catch under the pins or studs $l$ of the plow or shovel standard arms serve, in addition to effecting a connection between said parts, to retain the plow or shovel standards steady as against lateral displacement, while to the shaft $e$ of the dropping-wheel C are connected stirrers or agitators $s$, to loosen the seed or fertilizer to facilitate the taking up of the same by the cup or cell $f$ of said wheel in its rotation preparatory to depositing the seed or fertilizer in the boot, whence it is conducted to the ground into the drill made by the plow or shovel of the standard carrying, as before stated, said boot.

The series of plows or shovels also adapt the machine for cultivating purposes when not in use as a planter or fertilizer-distributer.

Having thus fully described my invention, what I claim, and desire to secure by Letters Patent, is—

1. A corn-planter consisting of the receptacle and chamber, the slide for regulating the passage of the contents of said receptacle, the spring-arm secured to said chamber, and the dropping wheel or disk having the seed or fertilizing carrying cell, the plow or shovel standard arms having lateral pins or studs, the bail-shaped lever carrying forwardly-projecting fingers, the handled roller or shaft connected by cords or straps to said bail-shaped lever, and the harrow, also connected by a cord or strap to said roller or shaft, substantially as shown and described.

2. In a corn-planter, the combination of the harrow pivotally secured at the rear end of the frame, the handled roller or shaft, said harrow being connected to said roller by a cord, and the bell-shaped lever for raising and lowering the plow or shovel standard arms, also connected to said roller by a cord, substantially as shown and described.

3. The combination, with the driving-wheels, one of said wheels carrying a pawl, and the ratchet-wheel secured upon the shaft of said wheels and gearing with a pinion geared to a third pinion, of the dropping wheel or disk having the seed or fertilizing carrying cell, and carrying screws or projections, and acted upon by a spring-arm, substantially as shown and described.

In testimony whereof I affix my signature in presence of two witnesses.

ABRAM GLISSON.

Witnesses:
J. W. HOWELL,
W. I. CARROL.